United States Patent [19]

Sussman

[11] Patent Number: 4,524,944
[45] Date of Patent: Jun. 25, 1985

[54] PLANT-WATERING DEVICE

[76] Inventor: Howard Sussman, 3101 NW. 25th Ave., Pompano Beach, Fla. 33060

[21] Appl. No.: 453,612

[22] Filed: Dec. 27, 1982

[51] Int. Cl.³ .......................... B05B 1/30; F16K 7/06
[52] U.S. Cl. ........................ 251/6; 47/48.5; 251/4; 251/9
[58] Field of Search .......... 251/4, 6, 7, 9, 10, 251/98, 284, 342; 24/129 D, 132 WL, 115 R; D8/2, 3; D23/6; 47/1 R, 1.5, 48.5

[56] References Cited

U.S. PATENT DOCUMENTS

| 2,356,865 | 8/1944 | Mason | 251/9 |
| 4,097,020 | 6/1978 | Sussman | 251/10 |
| 4,434,823 | 3/1984 | Hudspith | 251/6 |

FOREIGN PATENT DOCUMENTS

| 2332732 | 1/1974 | Fed. Rep. of Germany | 251/9 |
| 0605432 | 5/1960 | Italy | 251/7 |

Primary Examiner—Samuel Scott
Assistant Examiner—Helen A. Odar

[57] ABSTRACT

A device connected at a remote end to a water faucet for metering water through a squeezable tube for watering plants or the like, in which prior art clamps to pinch the tube and thus control the volume of water flow therethrough are replaced by a rotatable cam, which obviates damage, due to pinching, in the tube, and other prior art shortcomings.

1 Claim, 4 Drawing Figures

PLANT-WATERING DEVICE

The present invention relates generally to plant-watering devices of the type described and illustrated in U.S. Pat. No. 4,097,020, and more particularly to an improved technique for closing the flow passage of the tube of such device, wherein there is no pinching in on the tube by a clamp which unavoidable marks or causes indentations therein, and which ultimately causes leaks or other malfunctioning.

To reach from a faucet at a remote location to the indoor location of plants requiring watering, use is typically made in presently known plant-watering devices of a tube of plastic or similar construction material, which is readily squeezed to control the volume of water flow therethrough. In these prior art devices, the squeezing of the tube is achieved using a clamp which has a contact edge that is forced into the tube and closes off the flow passage. The clamp contact edge movement into the tube, coupled with the outward or radially oriented water pressure of the tube bearing internally against the externally applied contact edge, unavoidable causes a surface indentation or marking in the tube, which may result in leaks or other malfunctioning.

Broadly, it is an object of the present invention to provide an indoor plant-watering device having a tube-squeezing operational mode, but without the shortcomings and disadvantages of prior art clamp-operated devices.

Specifically, it is an object to employ a smooth-surfaced cam to close the flow passage and cause the release therein, wherein a fully open and fully closed flow condition, as well as all flow conditions therebetween, are achieved for the plant-watering device without damage to the tube component thereof.

An improved indoor plant-watering device demonstrating objects and advantages of the present invention includes as an essential operative member a rotatable cam-like member, having a peripheral contact surface thereon at variable distances from a rotation axis such that the leading end of said surface is at a selected minimal distance and the trailing end thereof is at a selected maximum distance, and said surface is of a smooth configuration therebetween. A tube of squeezable construction material is disposed in the housing of the device for flowing water from a source to a point of discharge, said tube being more particularly located in the rotative path of the peripheral surface of the cam. Thus, cam rotation is effective to establish minimal squeezing contact against the tube for providing a fully open flow condition in the tube operatively associated with the leading end of the cam-like surface and maximum squeezing contact, or a fully closed condition therein, operatively associated with the trailing end thereof, and all flow conditions therebetween. As a consequence, there is adjustability in the volume of the water discharging from the device afforded by the cam-like member, the use of which also obviates any possible damage to the tube by reason of the contact established therewith being by said cam smooth peripheral surface.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawings, wherein.

Figure 1:
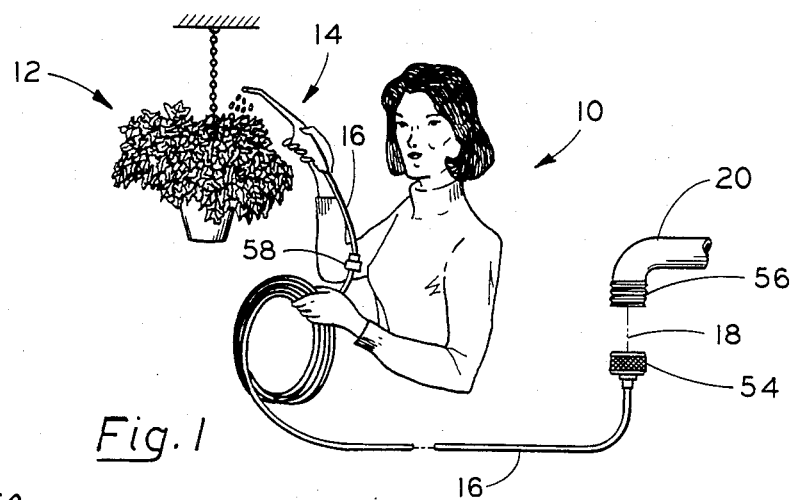
FIG. 1 is a perspective view illustrating typical use of the within improved plant-watering device.
Figure 4:
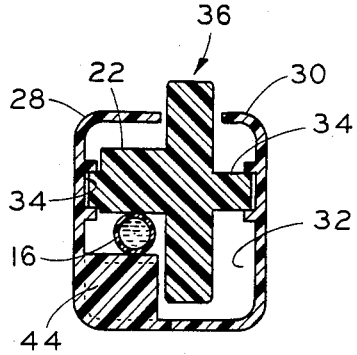
FIG. 4 is a sectional view rotated slightly to provide a vertical orientation, as taken along line 4—4 of FIG. 2, illustrating how the components effect the volume of water flowing through the device.

To facilitate the indoor watering of plants, use is made of a device having a long hose or tube connection to a source of water through which at its opposite end, namely, the end held by the user at the location of the plant, the user can effectively manipulate the device to provide a selected volume of water to be used in watering the plant. Thus, as shown in FIG. 1, the user would typically be at the location of a hanging plant 12 or the like, and would manipulate the plant-watering device or tube 16, having an end affixed or appropriately connected, as at 18, to a water faucet 20. The current practice with plant-watering devices in the category of the within device 14, is to use clamps which actually pinch into the tube 16 in order to control the volume of the water which is permitted to pass through the device 14 during the plant-watering service thereof. Exemplifying this technique is the clamp of U.S. Pat. No. 3,942,228 and, for specific use on a plant-watering device, the clamp of U.S. Pat. No. 4,097,020. These patents, and particularly U.S. Pat. No. 4,097,020, are helpful in defining the end use of the within device, and to this extent are therefore incorporated by reference herein. What distinguishes the improved device 14 hereof, and what will now be described in detail, is the operational mode which obviates any need for a clamp which actually pinches into the tube 16. It will be understood that the tube is typically of plastic or other construction material, and the pinching therefore unavoidably causes damage to the tube. Instead, and as now will be described in detail, the plant-watering device 14 hereof, as more particularly illustrated in FIGS. 2-4, uses a cam-like member 22 which is characterized by a smooth peripheral surface 24 to exercise control and supervision over the flow of water 26 through the tube 16. That is, and as is perhaps best shown in FIG. 4, the device 14 includes two housing halves 28 and 30 which when adhesively secured together cooperate to bound an internal compartment 32. The opposite side wall of the housing units 28 and 30 have molded indentations 34 therein in which an operative member or component 36 is appropriately journaled for rotation. More particularly, and as may best be understood by a comparison of FIGS. 2 and 4, member 36 includes a thumb knob 38, aptly so-called because it is manipulated in rotation by the user's thumb, which is integrally formed with the previously referred to cam-like member 22.

Figure 2:
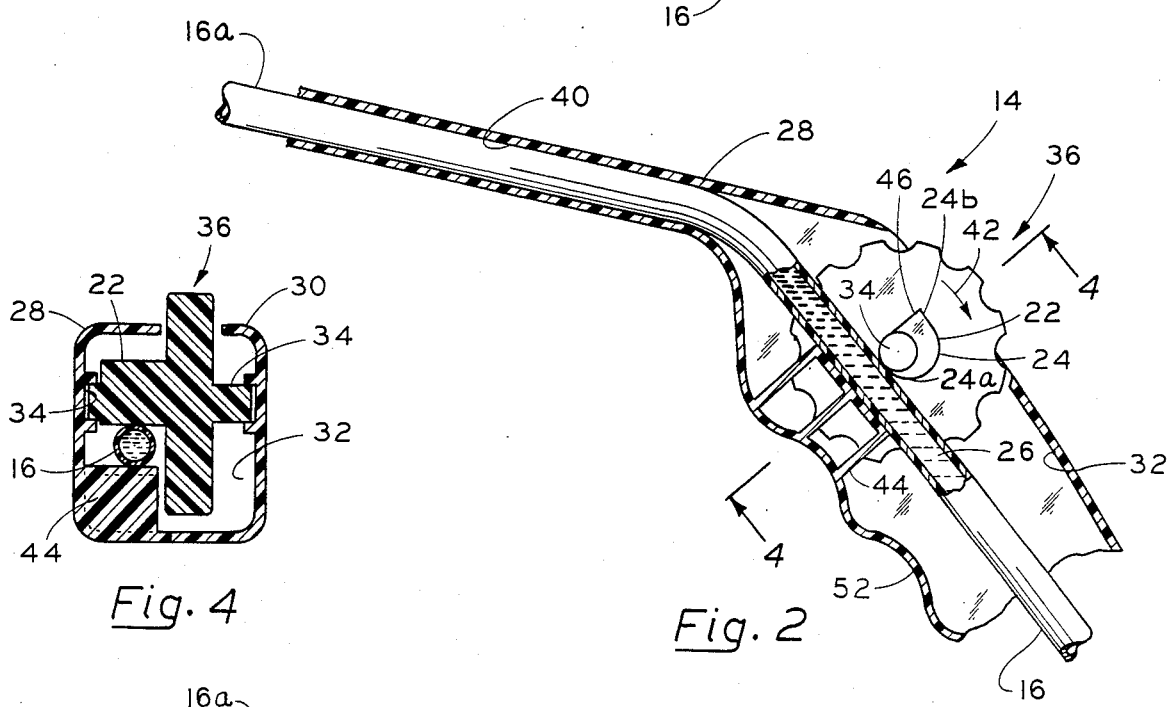
FIG. 2 is a partial elevational view in longitudinal section illustrating more particularly the internally housed components of the within device and, more specifically, the operating condition of said components which provide full or maximum flow of water through the device.

Referring now particularly to FIG. 2, it will be noted that the housing halves, as demonstrated by housing halve 28 illustrated in FIG. 2, narrows down from the compartment 32 to a size 40 that more nearly approximates the diameter of the tube 16. As a result, the length portion of tube 16 is conveniently disposed in the smaller-size compartment 40, while a remaining portion is passed in the path of rotation 42 beneath the cam 22 and above a molded platform 44.

Figure 3:
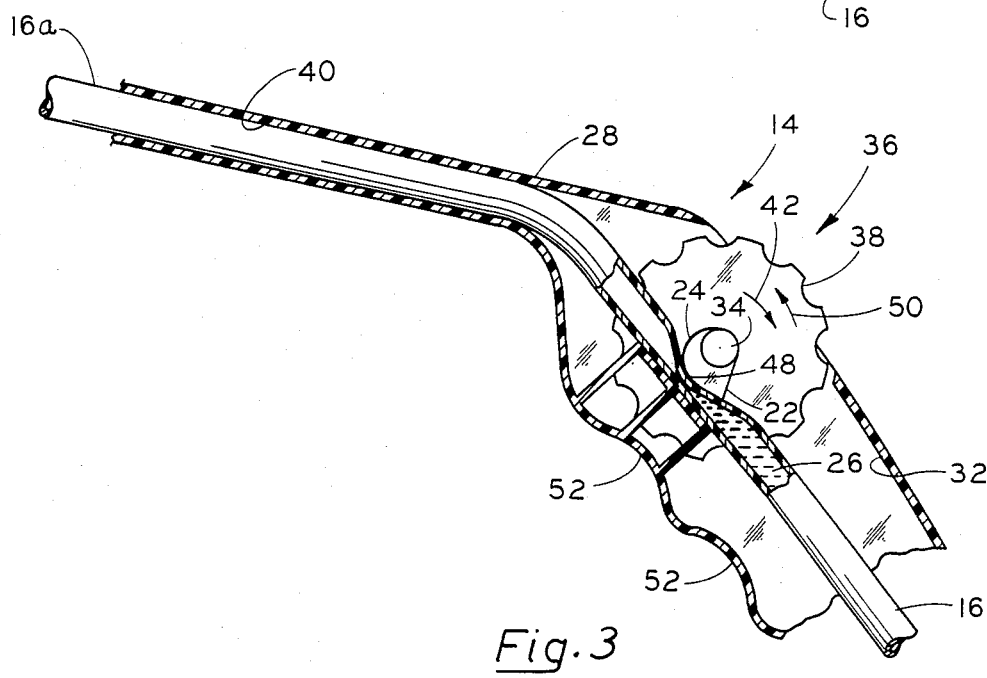
FIG. 3 is a view similar to FIG. 2, but illustrating the operating condition of the components which is effective in closing off all flow of the water through the device.

Referring now particularly to the structural features of the cam-like member 22, it will be noted that its peripheral surface 24 is at varying distances from its central rotation axis. More particularly, and using the rotative path 42 as a reference, the leading end 24a of surface 24 is located nearest the rotation axis while the trailing end 24b is located the maximum distance 46 from said rotation axis. As a consequence, and as may perhaps best be understood by a comparison of FIGS. 2 and 3, when the leading end 24a of the peripheral surface 24 is adjacent the tube 16, there is hardly any contact established between member 22 and the tube 16 and thus there is a maximum or full volume of water 26 permitted to flow through the tube 16. In contrast, and as illustrated in FIG. 3, after rotation in the direction 42 of approximately 80 angular degrees using the thumb knob 38, the cam 22 is pressed into the tube 16, thus establishing the condition illustrated in FIG. 3 from which it will be understood that there is little or no flow of water past the cam 22 and thus through the exit end 16a of the tube. It will be specifically noted that the contact between the cam 22 and tube 16 is established with the smooth peripheral surface 24, as at location 48, and is characterized by the fact that there is no pinching and thus no possibility of any indentations or other markings actually being induced in the tube 16. As a result of the absence of any indentations or surface markings, it has been found in practice that the tube 16 is less vulnerable to damage which ultimately results in leaks and other malfunctioning.

As further illustrated in FIG. 3, rotation of knob 38 in the reverse counter-clockwise direction 50, releases the squeezed tube 16 an correspondingly restores flow past the cam 22 and thus through the exit 16a of the plant-watering device. Thus, by simple thumb-manipulation of the knob 38 through the rotative paths 42 and 50, it is readily possible to achieve full flow or no flow of water 26 through the tube 16 and all flow conditions therebetween. Also of significance is that the length of the surface 24 which contacts the tube 16 is subtended by an angle of 90 degrees and is thus characterized by a gradual, rather than abrupt, change in curvature, particularly at the trailing end 24b. As a result, there is no tendency of the radially oriented water pressure in the tube 16 in the no-flow condition of FIG. 3 to rotate the cam 22 in the direction 50, even if the knob 38 is released by the user.

To facilitate use of the plant-watering device 14, the housing halves 28 and 30 are molded with finger grips 42 along their lower surfaces, and these components are additionally sized to fit comfortably in the user's palm with the user's fingers in the indentations 52 and the thumb in an appropriate position to manipulate the knob 38 through rotation. The recommended gripping for hand manipulation of the plant-watering device 14 can be generally understood from the illustration thereof in FIG. 1. Also as may be best appreciated from FIG. 1, it is contemplated that the faucet connection 18 will be achieved using a fixture 54 which is threadably engageable with the threaded end 56 of the faucet. Also, it is preferred that a threadedably engageable fixture 58 be used to connect the length portion of the tube 16 that is actually embodied in the plant-watering device 14 with a supply length thereof which extends from the faucet 20 to the actual location at which the plant-watering takes place.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. An improved indoor plant-watering device comprising a housing, a cam-like rotatable operative member having a peripheral contact surface thereon at variable distances from a rotation axis such that a leading end of said surface is at a selected minimal distance and a trailing end thereof is at a selected maximum distance and said surface is of a smooth configuration therebetween, said cam-like member having a pair of hubs extending laterally from opposite sides thereof journalled for rotation in opposite sides of said housing for establishing said rotation axis thereof, a large diameter knob located adjacent said cam-like member on said hubs having a knurled peripheral edge providing finger grips and also visual indices of positions of rotation of said cam-like member, a tube of squeezable construction material disposed in said housing for flowing water from a source to a point of discharge from said plant-watering device, and means for mounting said cam-like member for rotation on said housing such that the rotative path of said peripheral surface thereon is effective to establish squeezing contact of said surface against said tube for providing a fully open flow condition in said tube operatively associated with said leading end of said cam-like surface and a fully closed condition therein operatively associated with said trailing end thereof and all flow conditions therebetween such that there is adjustability in the volume of the water discharging from said device afforded by said cam-like member which also obviates any possible damage to said tube by reason of the established contact therewith by said cam smooth peripheral surface, and a cooperating pair of sides in said housing shaped as a handle, whereby the user is able to grip the device and to rotate said knob with the user's thumb on said gripping hand.

* * * * *